Aug. 7, 1934.  C. SCHATT  1,968,962
HAMMER OPERATING WITH A VARIATION IN ATMOSPHERIC PRESSURE
Filed July 23, 1932   7 Sheets-Sheet 1
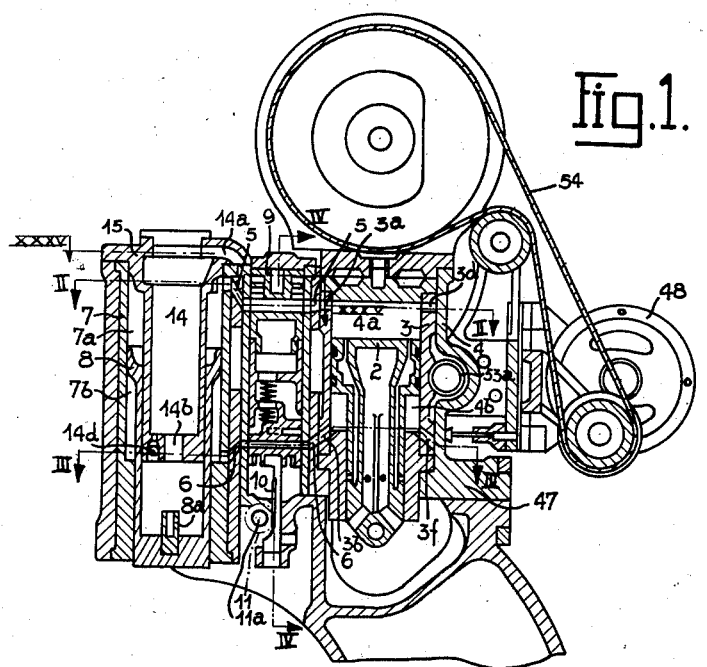
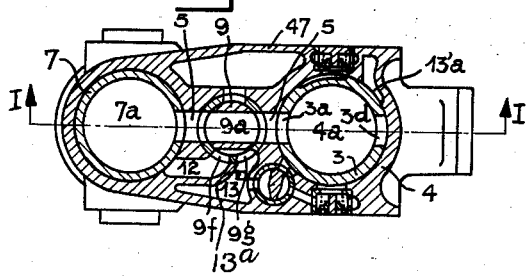
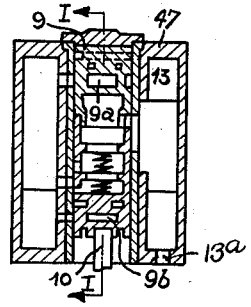
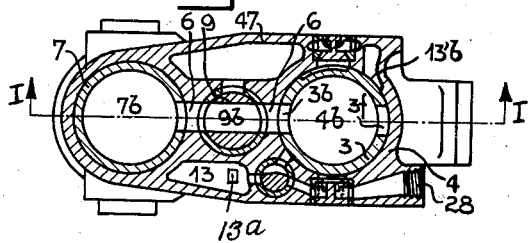
Inventor:
Charles Schatt
By
Attorney Aug. 7, 1934.  C. SCHATT  1,968,962
HAMMER OPERATING WITH A VARIATION IN ATMOSPHERIC PRESSURE
Filed July 23, 1932  7 Sheets-Sheet 2

INVENTOR
CHARLES SCHATT
By Emil Bönnelycke
ATTORNEY

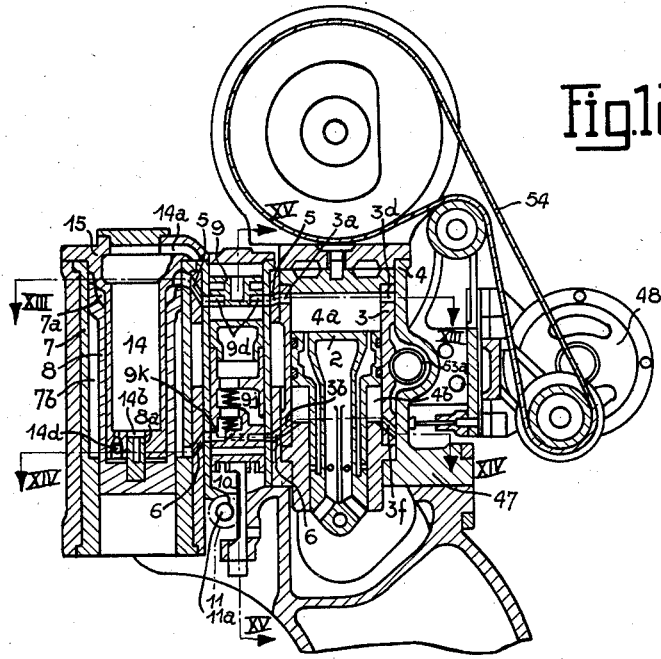
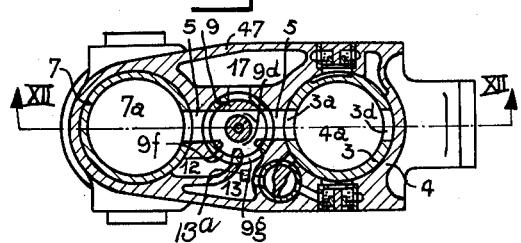
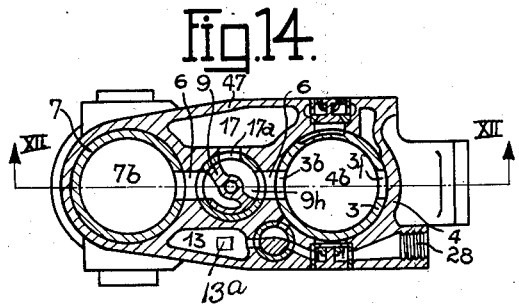
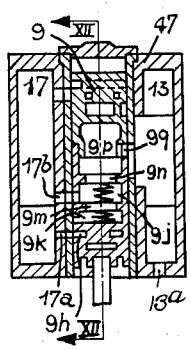

Aug. 7, 1934.  C. SCHATT  1,968,962
HAMMER OPERATING WITH A VARIATION IN ATMOSPHERIC PRESSURE
Filed July 23, 1932  7 Sheets-Sheet 4
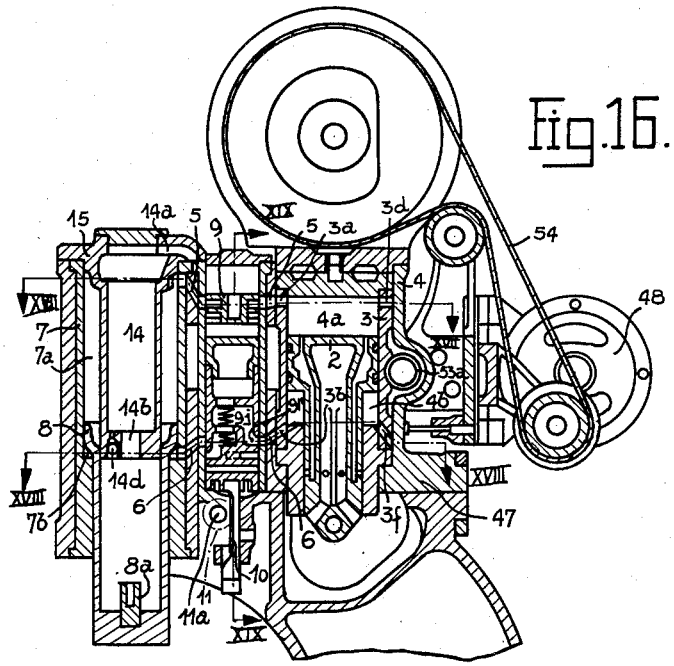
Fig.16.
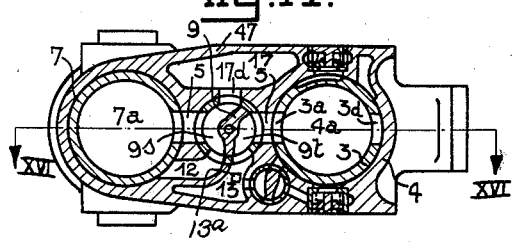
Fig.17.
Fig.19.
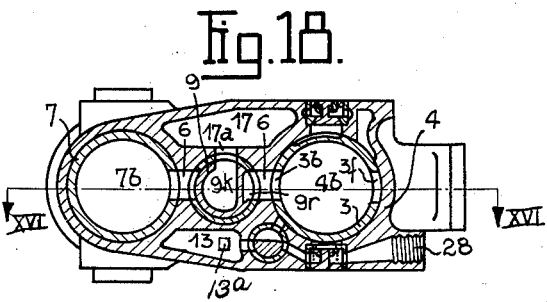
Fig.18.
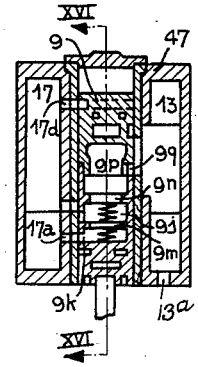
Inventor:
Charles Schatt
By
Attorney.

Aug. 7, 1934.                     C. SCHATT                      1,968,962
HAMMER OPERATING WITH A VARIATION IN ATMOSPHERIC PRESSURE
Filed July 23, 1932                       7 Sheets-Sheet 5

Inventor:
Charles Schatt
by
Attorney

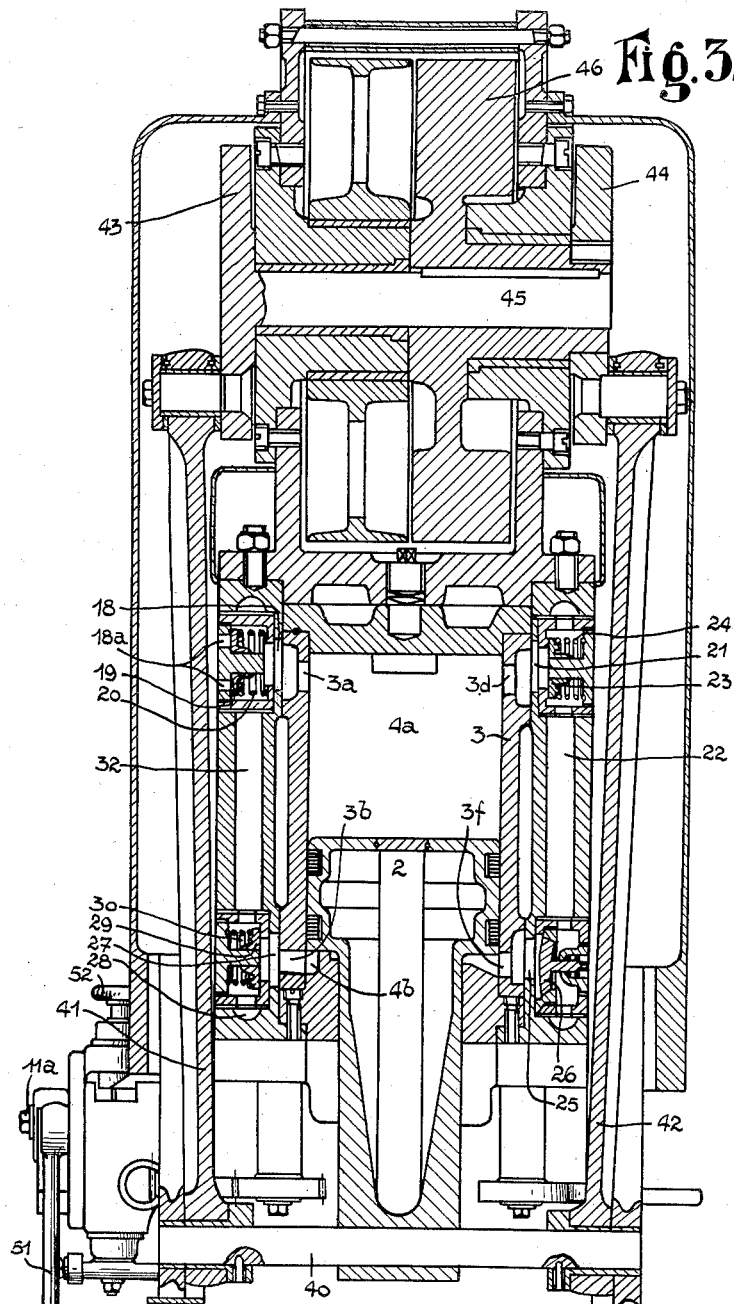

Patented Aug. 7, 1934

1,968,962

UNITED STATES PATENT OFFICE 1,968,962

HAMMER OPERATING WITH A VARIATION IN ATMOSPHERIC PRESSURE

Charles Schatt, Brussels, Belgium

Application July 23, 1932, Serial No. 624,330
In Belgium September 3, 1931

5 Claims. (Cl. 60—62)

The invention relates to a hammer operating with a variation in atmospheric pressure and comprising a working cylinder containing a working piston, a second cylinder containing a falling mass and a valve distributing air between the working cylinder and the cylinder containing the falling mass, the said valve comprising in particular ducts adapted to be put into communication with each other by the displacements of the valve according to the work to be done.

In this type of hammer, according to the position of the distributing members, it is possible to obtain either full ramming or a suspension of the mass or a pressure of the mass or light ramming, by the combined action of the compression and suction of air on the falling mass, and the kinetic energy of the latter.

Up to the present time the various channels formed in the distributing member and traversed by the air moving between the working cylinder and the cylinder containing the falling mass have been relatively long, on account of the fact that these channels were partly situated in the direction of the axis of these cylinders. Further, the ducts which put these channels into communication with the others are long on account of the fact that these channels were relatively distant from each other. The path followed by the air was relatively long and complicated. Consequently, as a result of the air friction, the latter was considerably heated, and the synchronism between the working piston and the falling mass was destroyed.

The object of the present invention is to remove these disadvantages and to shorten as much as possible the path followed by the air between the working cylinder and the cylinder containing the falling mass.

For this propose according to the present invention these channels are situated substantially in the plane of the axes of the two said cylinders, and at right angles to these axes, and the ducts which put certain of these channels into communication with each other are short relatively to the length of the channels they connect together.

In the known hammers operating with a variation in atmospheric pressure, when it is desired to influence the blow struck by the falling mass after the latter has been dropped with the maximum force, a braking action is exerted on the falling mass at the end of its stroke by producing cushions of air below it. Consequently, more power is required when striking light blows than when striking with full force, because in the former case shock absorbing air cushions have to be produced.

In order to remove this disadvantage, according to the invention, the working piston is arranged in a movable sleeve provided on the one hand with ports adapted to provide a communication between the distributing members and the working cylinder, and on the other hand other ports arranged in such a way as to become situated nearer and nearer orifices communicating with the atmosphere, while the first ports move gradually away from coincidence with the channels leading to the distributing members. In this way only a small amount of power is required as compared with that necessary when striking with full force, because the working piston works partially light.

In order to facilitate driving the hammer, the orifices communicating with the atmosphere and the ports which can be brought into coincidence with these channels are arranged with respect to the first ports and to the channels leading to the distributing members, in such a way that the interior of the sleeve can be put into communication with the atmosphere without being put into communication with the distributing members. In this way, the hammer can easily be made to work light without stopping the engine driving it.

The invention has the further object of permitting the hammer to be employed as an air compressor. For this purpose, the said ports can be made to coincide with channels provided with valves and communicating either with the atmosphere or with a duct delivering air into a reservoir.

Another object of the invention is to provide a mixed action hammer working either with a variation of atmospheric pressure or with compressed air. In such a hammer, the working piston is arranged in a movable sleeve provided on the one hand with ports for establishing a communication between the distributing members, and a valve for controlling the compressed air, the said ports and grooves being situated in such a way as to put the distributing members in communication either with the working cylinder or with the compressed air controlling valve.

The change over from working with variation in atmospheric pressure to working with compressed air can moreover be made without stopping the working piston, on condition that the said sleeve is provided at the same time with all the above mentioned ports and grooves. A mixed action hammer according to the invention thus permits forging work to be carried out for which it was previously necessary to have a hammer working with variation in atmospheric pressure and a hammer working with compressed air, or else a large hammer working with variation in atmospheric pressure capable of being used for work requiring a considerable drop of the hammer, such as pressing, die-stamping, etc., but working under unfavourable conditions both from the point of view of speed and facility of manipulation when carrying out the usual kind of work.

Finally the invention has the further object of providing a hammer working with variation in atmospheric pressure, in which the mechanism controlling the displacement of the working piston is situated above the working cylinder. This arrangement permits the rammer to be mounted upon any frame without requiring any accurate adjustment between the cylinder and the frame. It permits use to be made of existing frames and it also permits the hammer to be suspended from frames of any kind.

Other details and features of the invention will appear from the following description and from the accompanying drawings, which illustrate diagrammatically one form of construction of a hammer according to the invention.

Figure 1 is a longitudinal section taken along a plane passing through the axis of the falling mass, the axis of the distributing valve and the axis of the working cylinder in the case when the hammer works under full load.

This plane is represented by the line I—I in Figures 2 to 4.

Figures 2 and 3 are sections taken along the planes represented by the lines II—II and III—III in Figure 1. In these figures, the arrangement situated in the working cylinder and in the cylinder containing the falling mass has not been illustrated.

Figure 4 is a section taken along the plane represented by the line IV—IV in Figure 1.

Figures 12 to 15 and 16 to 19 are similar sections to those shown in Figures 1 to 4 respectively in the case of the suspension of the falling mass and of the support of the latter. These sections are indicated by the lines XII—XII to XIX—XIX similar to the lines I—I to IV—IV.

Figure 32 is a vertical section taken along the line XXXII—XXXII in Figure 31 the vertical section being drawn on a larger scale.

In the various figures the same reference numerals and letters refer to the same parts.

Figure 5:
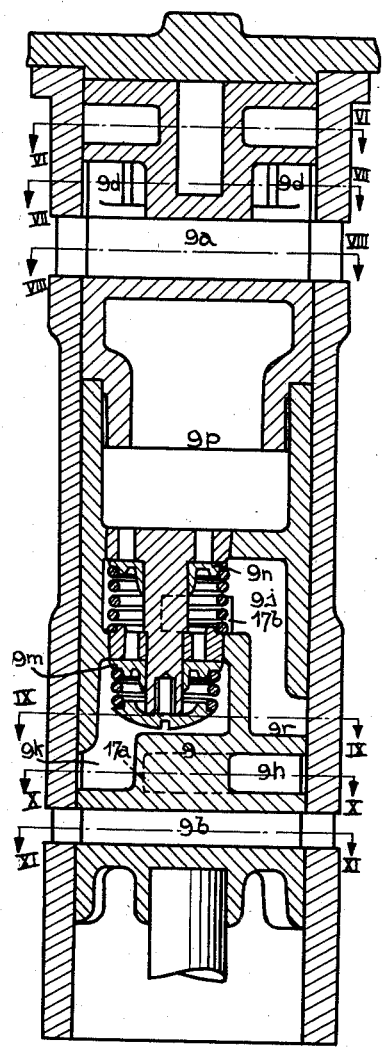
Figure 5 is a similar section to that shown in Figure 1 but taken through the distributing valve and its sleeve only, these two parts being shown to a larger scale.
Figure 6:
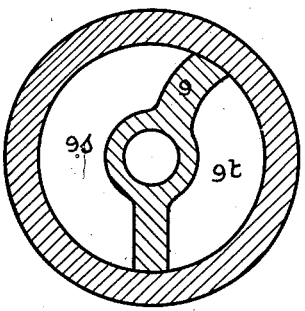
Figures 6 to 11 are cross sections taken through planes represented by the lines VI—VI to XI—XI in Figure 5.
Figure 9:
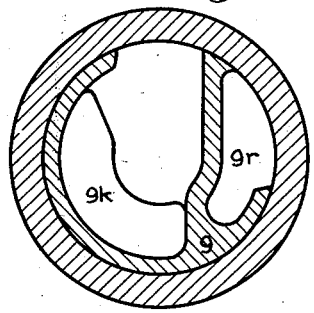
Figure 7:
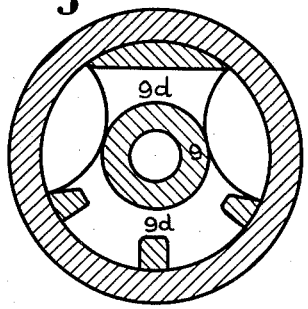
Figure 10:
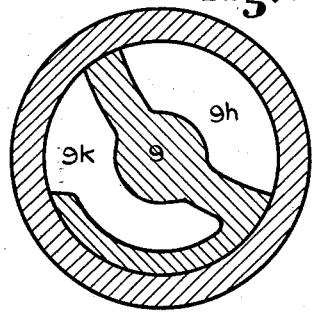
Figure 8:
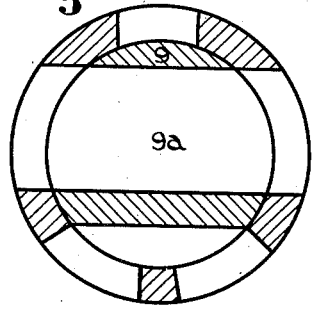
Figure 11:
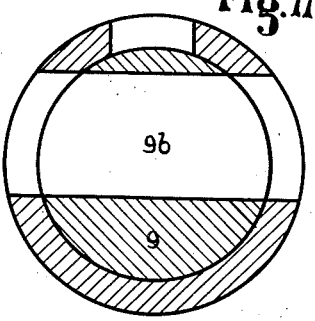

Figures 1 to 4 show a hammer comprising a working piston 2 moving in a manner to be described below, in a sleeve 3 situated in a working cylinder 4.

This sleeve is provided on the one hand with ports $3a$ and $3b$ which can be made to coincide respectively with the ducts 5 and 6 formed in a cylinder block 47 between the working cylinder 4 and a cylinder 7 in which is situated the falling mass 8, and on the other hand ports $3d$ and $3f$ which can be made to coincide respectively with apertures $13'a$ and $13'b$ (Figures 2 and 3). The passage of the air through the ducts 5 and 6 is controlled by a distributing member in the form of a slide valve 9. This valve is shown in detail in Figures 5 to 11.

Figure 35:
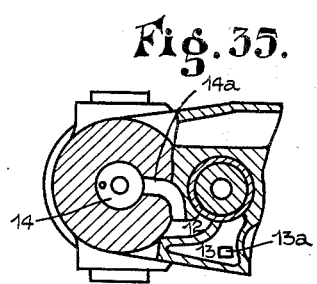
Figure 35 is a sectional view taken on line XXXV—XXXV of Figure 1.

In the case when the hammer strikes with full force, this valve is arranged as shown in Figures 1 to 4. For this position, when the working piston 2 rises, the air which it forces out above it can pass directly from the chamber $4a$ of the cylinder 4, to the chamber $7a$ of the cylinder 7 above the falling mass, by passing through a channel $9a$ in the valve 9. At the same time, the piston 2 draws air through a channel $9b$ in the valve 9, into the chamber $4b$ of the cylinder 4 situated below it; this air comes from the chamber $7b$ of the cylinder 7 below the falling mass 8. For the same position of this valve, a chamber 14 in the interior of a cover 15 which is in permanent communication with a reservoir 12 through a channel $14a$ (Fig. 35) communicates with the atmosphere, on account of the fact that a channel $9f$, leads on the one hand into the reservoir 12 and on the other hand into a channel $9g$ which leads into the reservoir 13 communicating directly with the atmosphere by a hole $13a$ provided in its bottom.

The movement of the working piston 2 thus produces a synchronous movement of the falling mass 8 which is simultaneously subjected to a compression on one face in the chamber $7a$ and a suction on the opposite face in the chamber $7b$. The falling mass 8 is thus thrown violently upon the work piece.

When the working piston 2 descends, the falling mass is subjected to a compression on its lower face in the chamber $7b$, and a suction on its upper face in the chamber $7a$. When the falling mass approaches the top of its travel, a pin $8a$ which it carries engages in an aperture $14b$ in the cover 14, and provokes the formation of a shock absorbing cushion, the expansion of which is very effective for throwing the falling mass subsequently downwards. In order to prevent this downward movement from being opposed in any way, a suction valve is provided, which is formed for example by a ball $14d$, which by falling freely permits atmospheric air to fill the space between the end of the cover 14 and the end of the falling mass.

The valve 9 can be displaced in the direction of its axis by acting for example upon a rack 10 rigid with it, through the medium of a toothed wheel 11 keyed on a shaft 11a which can be rotated by acting from the outside of the hammer upon a hand lever 50 (Figure 31), or upon a rod 51 adapted to be controlled by foot.

The lever 50 or the rod 51 is connected to a member 55 (Figs. 31 and 33) which may be rotated freely about shaft 11a. This member 55 carries a pawl 52 which may engage either in the groove 56a of wheel 56 keyed on shaft 11a or in groove 57a of wheel 57 loosely mounted on shaft 11a. For the first position of the pawl, action on the hand lever 50 or on the pedal operated rod 51 moves the shaft 11a and consequently the pinion 11, the rack 10 and the slide valve 9.

If the valve 9 is moved into the position shown in Figures 12 to 15, the chamber 4a above the working piston 2 is put simultaneously into communication with the chamber 7a through a duct 9d, with the reservoir 12 through the duct 9f and with the reservoir 13 through the duct 9g. During its movement, the working piston 2 thus draws in and delivers air to the atmosphere and the chambers 7a and 14 are in communication with the atmosphere.

In the position of the valve 9 considered, the chamber 4b below the working piston communicates with a duct 9h. This duct opens out in front of an aperture 17a formed in the wall of an air reservoir 17. In the wall of this reservoir, is formed a second aperture 17b (Figure 15) situated opposite a chamber 9j of the valve 9. A duct 9k (Figure 5) leads into this chamber 9j. A valve 9m is constantly urged by a spring towards a position for which it closes the orifice through which the duct 9k communicates with the chamber 9j. This valve thus serves for retaining in the duct 9k the air previously driven therein when the pressure in the chamber 9j, due to the descent of the working piston 2, was sufficient to overcome the spring. This valve is situated, as shown, very near the chamber 7b in which it must hold the compressed air. As the duct 9k communicates with the chamber 7b (Figure 12) below the falling mass, the latter is raised. While the working piston 2 rises, a suction is exerted in the chamber 4b, the duct 6, the duct 9h, the aperture 17a, the reservoir 17, the aperture 17b and the chamber 9j. The retaining valve 9m is down on its seating, thus holding the falling mass 8 raised. The above mentioned suction causes a second retaining valve 9n to move towards the chamber 9j, which valve 9n controls the communication between the chamber 9j and a chamber 9p. The latter communicates through an aperture 9q with the reservoir 13 which opens into the atmosphere.

It will be observed that the path followed by the air in the valve 9 is very short on account of the superposition of the ducts and chambers which are traversed by the air very closely to one another, in the direction of the axis of the valve 9, which ducts are moreover situated in the plane of the axes of the cylinders and are substantially perpendicular to these axes.

In order to exert pressure on the falling mass 8 the valve 9 is moved into the position shown in Figures 16 to 19. In this position, when the working piston 2 descends, it drives air from the chamber 4b through the duct 6 into a duct 9r (Figures 16 and 18). The latter opens into the chamber 9j (Figure 16). The compressed air pushes the valve 9m towards the duct 9k and presses the valve 9n on its seating. The duct 9k communicates through the aperture 17a with the air reservoir 17 (Figures 18 and 19). In the wall of the latter is also formed an aperture 17d (Figures 17 and 19) into which leads a duct 9s which also leads into the part of the duct 5 (Figure 17) communicating with the chamber 7a above the falling mass. The duct 9s also leads into the reservoir 12 which communicates through the duct 14a with the chamber 14 formed in the cover 15 of the cylinder 7. The falling mass is thus pressed downwards not only by its face in contact with the chamber 7a but also by that in contact with the chamber 14. During the descent of the working piston 2 air is drawn in the chamber 4a through the part of the duct 5 which leads into it and through a duct 9t which also leads into the reservoir 13 communicating with the atmosphere. No objectionable suction is therefore produced above the working piston 2.

While the working piston 2 rises, the suction produced in the chamber 4b has the effect of pressing the retaining valve 9m more strongly on its seating and consequently maintaining above the falling mass the pressure which bears downwards on the latter, and of separating the second retaining valve 9n from its seating, so as to put the chamber 4b in communication with the atmosphere through the chamber 9p, the aperture 9q and the reservoir 13. While the piston rises the air in the chamber 4a is delivered to the atmosphere through the duct 9t and the reservoir 13.

Figure 20:
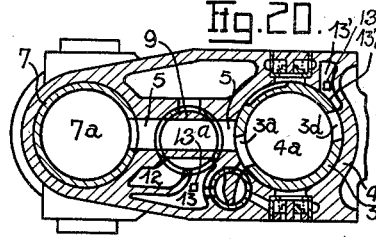
Figures 20 and 21 are similar sections respectively to those shown in Figures 2 and 3 in the case when the hammer is executing light blows.
Figure 21:
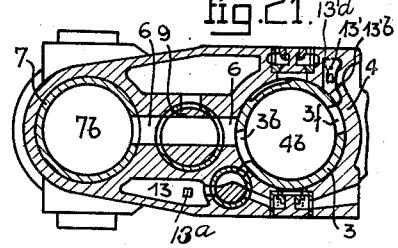

When, instead of striking with full force as is the case when the parts are in the position shown in Figures 1 to 4, it is desired to strike light blows the force of which can be regulated as desired, the valve 9 is left in the position shown in Figures 1 to 4, but the sleeve 3 is turned into a position such as that shown in Figures 20 and 21. For this position the ports 3a and 3b are now only partly opposite the ducts 5 and 6, while the ports 3d and 3f are partly opposite apertures 13'a and 13'b leading into a reservoir 13' communicating with the atmosphere by a hole 13'd provided in its bottom. By suitably arranging these apertures 13'a and 13'b the apparatus may be arranged so that, when the working piston 2 rises, a part of the air in the chamber 4a will be delivered into the atmosphere and another part into the chamber 7a above the falling mass, while the air drawn in below the latter into the chamber 4b comes partly from the atmosphere and partly from the chamber 7b below the falling mass. The power employed thus serves simply for displacing the falling mass with the required force.

Figure 22:
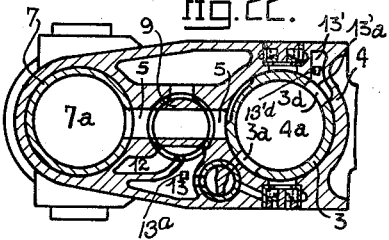
Figures 22 and 23 are partial cross sections similar to the sections II—II and III—III in Figure 1, but in the case when the hammer works light.
Figure 23:
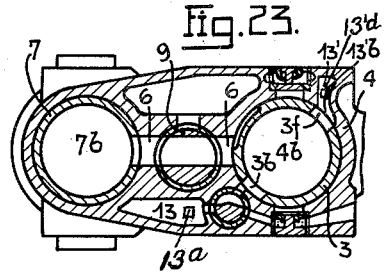

In the case when it is desired to stop the work of the hammer without stopping the motor which drives it, the parts are placed in the position shown in Figures 22 and 23. For this position the ports 3d and 3f are completely opposite the apertures 13'a and 13'b, while the ports 3a and 3b are no longer opposite the ducts 5 and 6 at all. The working piston 2 thus simply draws in atmospheric air and delivers air to the latter.

The working piston 2 may also be made to deliver compressed air into a reservoir. For this purpose the parts are placed for example in the position shown in Figures 24, 25 and 32.

For this position, the port 3a is in front of a duct 18 which leads to the atmosphere through holes 18a when a valve 19, which normally closes these holes under the action of a spring 20 is removed from these holes. The port 3d is in front of a duct 21 which communicates with a duct 22 when a valve 23, which normally closes it under the action of a spring 24, is separated from the end of this duct 21. The duct 22 can communicate with a duct 25 when a valve 26 is separated from its seating. The duct 25 opens out opposite the port 3f. In front of the port 3b opens a duct 27 which can communicate with a duct 28 when a valve 29 which normally closes the duct 27 under the action of a spring 30 is separated from the end of this duct. The duct 28 can be placed in communication with a compressed air reservoir 31, shown partially in Figure 32. A duct 32 leads into the duct 28 and surrounds the casing of the valve 19 which is completely closed on its periphery. The duct 5 communicates through a groove 3g with a duct 33, while the duct 6 communicates with a duct 34 through a groove 3h.

Figure 24:
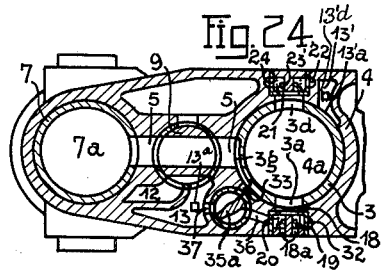
Figures 24 and 25 are partial cross sections similar to the sections II—II and III—III in Figure 1, but in the case when the working piston delivers compressed air into a reservoir and holds the falling mass in a raised position.
Figure 25:
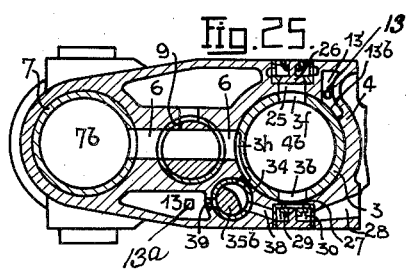
Figure 26:
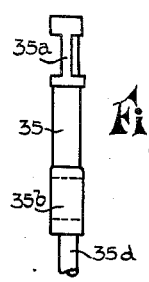
Figure 26 is a view of a valve which enters into consideration in Figures 24 and 25.

A valve 35 (Figure 26) is arranged in such a way that a part 35a will be in the position shown in Figure 24, while a part 35b will be in the position shown in Figure 25. For the position considered of the part 35a, a duct 36 leading into the duct 32 is separated from the duct 33 and from a duct 37, which on the one hand leads into the reservoir 13 and on the other hand communicates with the duct 33. For the position considered of the part 35b a duct 38 communicates with the duct 34 and these two ducts are separated from a duct 39 which leads into the reservoir 13.

Assuming that the working piston 2 descends. It draws atmospheric air into the chamber 4a (Figures 24 and 32) on account of the fact that it separates the valve 19 from its seating and presses the valve 23 upon its seating. At the same time it delivers compressed air towards the reservoir through the duct 28 (Figure 25) on account of the fact that the valve 26 is pressed on its seating and that the valve 29 is separated from its seating (Figure 32). At the same time compressed air passes through the duct 38, the groove 3h and the duct 6 below the falling mass, while the air which is situated above the falling mass is discharged to the atmosphere through the duct 5, the groove 3g, the ducts 33, 37 and the reservoir 13.

When the piston 2 rises, the air which it delivers above it presses the valve 19 upon its seating and separates the valves 23, 26 and 29 from theirs. A part of the compressed air is delivered into the duct 28 towards the reservoir and into the duct 38 towards the underside of the falling mass, while the other part fills the chamber 4h below the piston 2. This part thus assists the piston 2 to move upwards. It is this part which is delivered to the reservoir 31 during the following downward movement. The two stage delivery of the air of the chamber 4a into the reservoir permits the members connected to the piston 2 to be made lighter than they would have to be if the delivery was made in one single stage. In spite of this reduction in weight, they are still amply sufficient in the case when the piston 2 controls the falling mass directly. The above mentioned two-stage delivery also has the advantage of permitting use to be made of a motor of smaller power.

Figure 27:
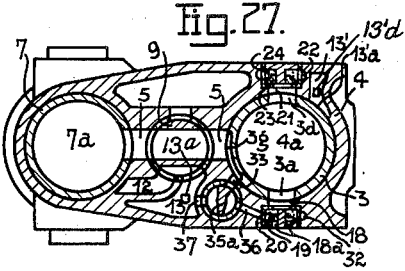
Figures 27 and 28 are partial cross sections similar to the sections II—II and III—III in Figure 1, but in the case when the working piston simply serves for delivering compressed air to a reservoir.
Figure 28:
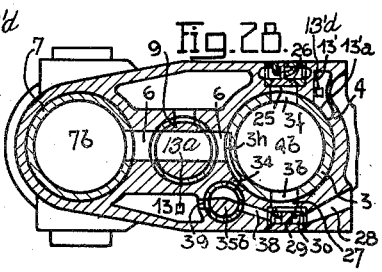

On account of the fact that the pressure of the compressed air is maintained in a continuous manner below the falling mass, the latter is kept suspended even if small leakages take place between it and its cylinder. It is to be noted that compressed air may also be delivered into the reservoir when the valve 35, instead of being in the position shown in Figures 24 and 25, is in that shown in Figures 27 and 28. In this case, the operation takes place as in the case of Figures 24 and 25, excepting that, when the working piston 2 rises, it no longer sends a part of the compressed air into the duct 38. Any communication between the cylinder 7 containing the falling mass and the other parts of the hammer is completely cut off.

Figure 29:
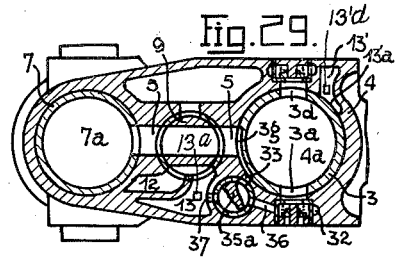
Figures 29 and 30 are partial cross sections similar to the sections II—II and III—III in Figure 1, in the case when the hammer is driven with compressed air.
Figure 30:
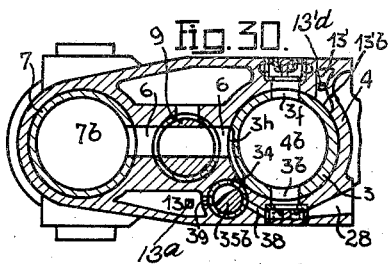

When it is desired to actuate the falling mass 8 by strong blows spaced apart, use is made of compressed air. For this purpose the valve 35 is placed in the position shown in Figures 29 and 30, and the other parts are left in the position shown in Figures 24 and 25. Under these conditions, the compressed air coming from the reservoir through the duct 28, the duct 32, the ducts 36 and 33, the groove 3g and the duct 5 is delivered above the falling mass while the air below the latter can escape to the atmosphere through the duct 6, the groove 3h, the ducts 34 and 39 and the reservoir 13. In order to make the falling mass rise, it is sufficient to place the valve 35 in the position shown in Figures 24 and 25.

Figure 33:
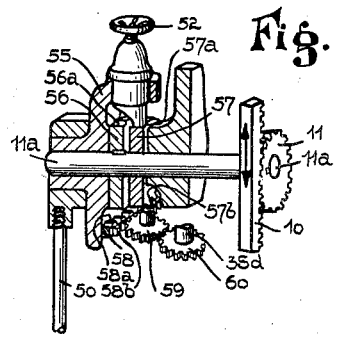
Figure 33 is a perspective view in partial section of mechanism for displacing either the distribution slide valve or the control valve for the passage of compressed air.

The displacements of the valve 35 may be effected by acting upon the lever 50 or the rod 51 after having placed a pawl 52 in a position such that it causes the said valve to be operated, for example, by engaging in the groove 57a of the wheel 57 (Fig. 33). This wheel has a toothed portion 57b which meshes with the teeth 58a of rack 58 of which a second set of teeth 58b laterally disposed mesh with a gear 59 which meshes with a gear 60 keyed to shaft 35d of valve 35.

Figure 34:
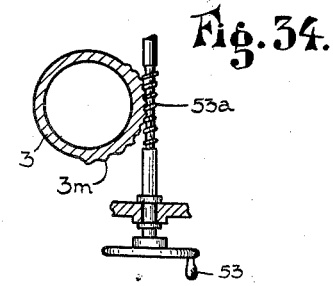
Figure 34 is a transverse sectional view of the movable sleeve and the mechanism for its displacement.

The rotation of the sleeve 3 can be obtained by acting upon a hand wheel 53 (Figs. 31 and 34) upon the shaft of which is keyed a worm 53a (Figures 1, 12, 16 and 34) which meshes with a segment of worm wheel 3m (Fig. 34) rigid with the sleeve 3.

Figure 31:
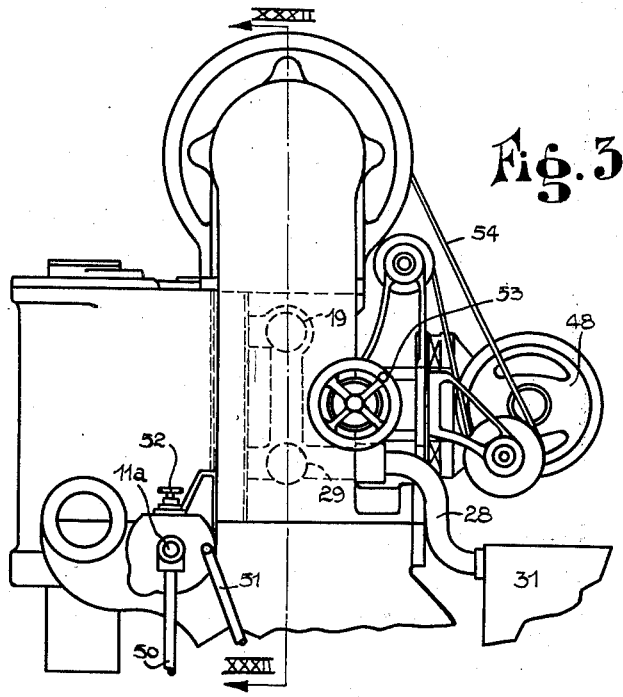
Figure 31 is a front view of the hammer.

According to the invention the mechanism which serves for controlling the displacement of the working piston 2 is mounted above this piston. As shown in Figure 32, the working piston 2 is connected by a pivot 40 to two links 41 and 42 situated on either side of the cylinder 4. These two links are each connected to a crank plate such as 43 or 44. These two plates are keyed upon the shaft 45 of a pulley 46 mounted above the cylinder 4. This pulley can be rotated by a belt 54 driven by a motor 48 (Figure 31). The latter is made rigid with the hammer. Consequently the arrangement can be mounted upon any frame or suspended from any framework.

It is obvious that the invention is not exclusively limited to the form of construction illustrated and that many modifications may be made in the shape, arrangement and construction of the parts employed without going outside the scope of the invention.

What I claim is:

1. A hammer working with variations in atmospheric pressure comprising, a working cylinder, a working piston in this cylinder, a second cylinder parallel to the first, a falling mass in this latter cylinder, communication ducts between the two cylinders, a slide valve controlling the said communication ducts, disposed between the two cylinders, channels in this slide valve adapted to be put in communication with the said ducts, a movable sleeve around the working piston, ports in this movable sleeve, adapted for establishing a communication between the working cylinder and the slide valve, other ports in this movable sleeve adapted for establishing a communication between the working cylinder and the atmosphere, the two kinds of ports being disposed relatively to each other in such a way that when the second ports move gradually into register with apertures communicating with the atmosphere, the first ports move gradually out for register with ducts leading to the slide-valve.

2. A hammer working with variations in atmospheric pressure comprising, a working cylinder, a working piston in this cylinder, a second cylinder parallel to the first, a falling mass in this latter cylinder, communication ducts between the two cylinders, a slide valve controlling the said communication ducts, disposed between the two cylinders, channels in this slide valve adapted to be put in communication with the said ducts, a movable sleeve around the working piston, ports in this movable sleeve adapted for establishing a communication between the working cylinder and the slide valve, other ports in this movable sleeve adapted for establishing a communication between the working cylinder and the atmosphere, the two kinds of ports being disposed relatively to each other in such a way that when the second ports move gradually into register with apertures communicating with the atmosphere, the first ports move gradually out of register with ducts leading to the slide-valve and that the interior of the movable sleeve can be put into communication, with the atmosphere without being in communication with the slide valve.

3. A hammer working with variations in atmospheric pressure comprising, a working cylinder, a working piston in this cylinder, a second cylinder parallel to the first, a falling mass in this latter cylinder, communication ducts between the two cylinders, a slide valve controlling the said communication ducts, disposed between the two cylinders, channels in this slide valve adapted to be put in communication with the said ducts, a movable sleeve around the working piston, ports in this movable sleeve adapted for establishing a communication between the working cylinder and the slide valve, other ports in this movable sleeve adapted for establishing a communication between the working cylinder and the atmosphere, the two kinds of ports being disposed relatively to each other in such a way that when the second ports move gradually into register with apertures communicating with the atmosphere, the first ports move gradually out of register with ducts leading to the slide valve, a compressed air reservoir, a compressed air controlling valve, grooves in the movable sleeve adapted for establishing a communication between the said slide valve and the said compressed air controlling valve, the said ports and grooves being situated in such a way as to put the slide valve in communication either with the working cylinder, or with the compressed air controlling valve according to the position of the movable sleeve.

4. A hammer working with variations in atmospheric pressure comprising, a working cylinder, a working piston in this cylinder, a second cylinder parallel to the first, a falling mass in this latter cylinder, communication ducts between the two cylinders, a slide valve controlling the said communication ducts, disposed between the two cylinders, channels in this slide valve adapted to be put in communication with the said ducts, a movable sleeve around the working piston, ports in this movable sleeve adapted for establishing a communication between the working cylinder and the slide valve, other ports in this movable sleeve adapted for establishing a communication between the working cylinder and the atmosphere, the two kinds of ports being disposed relatively to each other in such a way that when the second ports move gradually into register with apertures communicating with the atmosphere, the first ports move gradually out of register with ducts leading to the slide valve, a compressed air reservoir, a compressed air controlling valve, grooves in the movable sleeve adapted for establishing a communication between the said slide valve and the said compressed air controlling valve, the said ports and grooves being situated in such a way as to put the slide valve in communication either with the working cylinder or with the compressed air controlling valve according to the position of the movable sleeve, other ducts in the working cylinder communicating the one with the atmosphere the other with a reservoir, the last ducts being disposed so as to be adapted to be uncovered by the said ports, for a given position of the movable sleeve, valves for retaining in the cylinder the air drawn from the atmosphere by the working piston, valves for retaining in the reservoir the air delivered in it by the working piston.

5. A hammer working with variations in atmospheric pressure comprising, a working cylinder, a working piston in this cylinder, a second cylinder parallel to the first, a falling mass in this latter cylinder, communication ducts between the two cylinders, a slide valve controlling the said communication ducts, disposed between the two cylinders, channels in this slide valve adapted to be put in communication with the said ducts, a rotatable sleeve around the working piston, a gearing on this sleeve, a worm meshing with this gearing, means for rotating the said worm, ports in this rotatable sleeve adapted for establishing a communication between the working cylinder and the slide valve, other ports in this rotatable sleeve adapted for establishing a communication between the working cylinder and the atmosphere, the two kinds of ports being disposed relatively to each other in such a way that when the second ports move gradually into register with apertures communicating with the atmosphere, the first ports move gradually out of register with ducts leading to the slide-valve.

CHARLES SCHATT.